United States Patent [19]
Kang et al.

[11] Patent Number: 5,914,931
[45] Date of Patent: Jun. 22, 1999

[54] METHOD OF INITIAL FRAME SYNCHRONIZATION USING ORTHOGONAL FREQUENCY DIVISION MULTIPLEXING SIGNALS

[75] Inventors: Keon Woo Kang; Hwoe Won Yang; Byung Hwa Chang, all of Daejon, Rep. of Korea

[73] Assignee: Agency for Defense Development, Daejon, Rep. of Korea

[21] Appl. No.: 08/816,315

[22] Filed: Mar. 13, 1997

[30] Foreign Application Priority Data

Mar. 13, 1996 [KR] Rep. of Korea .................. 96-6626

[51] Int. Cl.⁶ .................................................. H04J 1/05
[52] U.S. Cl. ......................... 370/203; 370/208; 370/350
[58] Field of Search .................................. 370/203, 350, 370/503, 511, 512, 513, 514, 321, 210, 208

[56] References Cited

U.S. PATENT DOCUMENTS 5,444,697 8/1995 Leung ........................................ 370/19
5,652,772 7/1997 Isaksson ................................. 375/367

*Primary Examiner*—Jeffrey A. Hofsass
*Assistant Examiner*—Clement Townsend
*Attorney, Agent, or Firm*—Scully, Scott, Murphy & Presser

[57] ABSTRACT

An initial frame synchronization method for finding out the initial frame synchronization offset at a receiver using the orthogonal frequency division multiplexing signals by which any data is given and received in a frame unit, and by the estimation method of the phase difference variation and the maximum likelihood in the frequency domain. According to the invention, the initial frame synchronization is realized simply and rapidly by sending for initialization from the transmitter two frames consisting of the bit streams known already in the bit stream preamble, taking at the receiver only one among two frames to find out the synchronization offset value by any phase change, introducing a parameter corresponding to the variation of the phase difference without using merely the phase difference between the reference signal coordinates and the received signal coordinates, making a new parameter by adding the number of the subchannels used in a frame to such parameter, obtaining a conditional probability density function for the parameter by applying the probability theory and the approximation formula, and finally obtaining the initial synchronization offset value by the maximum likelihood estimation.

5 Claims, 2 Drawing Sheets

METHOD OF INITIAL FRAME SYNCHRONIZATION USING ORTHOGONAL FREQUENCY DIVISION MULTIPLEXING SIGNALS

BACKGROUND OF THE INVENTION

1. Field of the Invention

The present invention relates to a method for data communication of signals in units of a frame, using an orthogonal frequency division multiplexing (OFDM) algorithm, and in particular, to an initial frame synchronization method using the orthogonal frequency division multiplexing of signals for making it possible to find and synchronize the initial frame synchronization offset at the receiver in the frequency domain by an estimation of the variation of phase difference and the maximum likelihood (ML).

2. Description of the Conventional Art

Currently, there is increasing interest in multi-carrier modulation (MCM) for dividing a communication channel into several subchannels and transmitting may subcarriers through a single signal band using frequency division multiplexing (FDM) techniques. In MCM method, however, because several subcarriers occupying a narrow frequency domain are transmitted at one time, it results in a relatively longer symbol period compared with a single carrier modulation method, while MCM method has, owing to such characteristics, the advantages that equalization is easily performed and it has immunity to impulse noise.

The orthogonal frequency division multiplexing method which is a type of the above-described multi-carrier modulation, is a method to maximize the working frequency efficiency by securing an orthogonality among the multiplexed subcarriers. This multi-carrier modulation method, called "OFDM", has recently been applied by Cimini and Casas to the mobile radio channel with a multipath fading characteristic.(see.: L. J. Cimini, Jr., "Analysis and Simulation of a Digital Mobile Channel Using Orthogonal Frequency Division Multiplexing", IEEE Trans. Commun., vol. 33, No. 7, July 1985, pp. 665–675; and E. F. Casas, and C. Leung, "OFDM for Data Communication over Mobile Radio FM Channel—Part I: Analysis and Experimental Result", IEEE Trans. Commun., vol. 39, No. 5, May 1991, pp. 783–793).

FIG. 1 shows a block diagram of a general implementation of a transmitting and receiving system using the orthogonal frequency division multiplexing method. The orthogonal frequency division multiplexing modulator 10 consists, as shown in FIG. 1, of a serial/parallel converter 11 for converting input serial data into parallel data, an encoder 12 for encoding the output signals of the serial/parallel converter 11, an inverse fast Fourier transform (IFFT) converter 13 implementing the inverse fast Fourier transform of the output signals from the encoder 12, a parallel/serial converter 14 for converting the output signals of the inverse fast Fourier converter 13 into analog signals, and a digital/analog converter 15 converting the output data of the parallel/serial converter 14 into analog signals, while the orthogonal frequency division multiplexing demodulator 20 comprises an analog/digital converter 21 inputting the output signals of the orthogonal frequency division multiplexing modulator 10 through a transmitter 31, channels for transmission 32 and a receiver 33, and converting them into digital signals, a serial/parallel converter 22 converting the output signals of the analog/digital converter 21 into parallel data, a fast Fourier transform converter 23 for implementing a fast Fourier transform of the output signals of the serial/parallel converter 22, a decoder 24 for decoding the output signals of the fast Fourier converter 23, and a parallel/serial converter 25 for converting the parallel data output by the decoder 24 into serial data.

Therefore, in the orthogonal frequency division multiplexing transmitting/receiving system, the modulation and demodulation of the parallel data are carried out using the fast Fourier transform, and it is required to separate again the sampled data into a predetermined frame unit, and pass it through the fast Fourier transform routine, to restore at the receiver the data which was transmitted after being modulated by the frame unit. However, if the synchronization is in error in the course of forming the frame, the signals demodulated after the fast Fourier transform will be influenced by inter channel and intersymbol interference. Accordingly, the problem of synchronization in forming the frame must be treated especially as a matter of importance.

As an existing method for frame synchronization, there has used the method of detecting the energy of the signals received then performing coarse synchronization using a correlation, and then realizing a fine synchronization all in the time domain. (3. W. D. Warner, C. Leung, "OFDM/FM frame synchronization for mobile radio data communication", IEEE Trans. Veh. Technol. vol. 42, No. 3, August 1993, pp. 302–313).

In such conventional synchronization method as above-described, problems arise in that the process of synchronization is not only very complex, but the synchronization is not realized rapidly.

SUMMARY OF THE INVENTION

The object of present invention is to provide an initial frame synchronization method using the orthogonal frequency division multiplexing signals which enable the initial frame synchronization to be realized simply and rapidly by synchronizing the initial frame synchronization offset at the receiving step, after detecting it by the estimation of the variation of phase difference and the maximum likelihood in the frequency domain, using the orthogonal frequency division multiplexing signals transmitting and receiving the data in the frame unit.

For the purpose of the synchronization, the transmitting step sends two frames consisting of the bit streams known already in the bit stream preamble, and the receiving step takes only one frame from such two frames to find a synchronization offset by a variation of phase. But instead of merely using the phase difference between the reference and received signal coordinates, a new variable is added as much as the number of subcarriers used in one frame, by introducing the parameters equivalent to the variation of phase difference. Subsequently, we obtain a conditional probability density function of such variable by applying probability theory and approximation method to such variable, and finally find an initial synchronization offset value by an ML estimation. As described above, the initial synchronization is realized exactly within ±½ frame by the initial frame synchronization method, and the performance thereof has been verified by means of a computer simulation.

BRIEF DESCRIPTION OF THE DRAWINGS

The present invention will be more fully understood from the detailed drawings given hereinafter and the accompanying drawings give by way of illustration only and not limitive of the present invention, and wherein.

DETAILED DESCRIPTION OF THE PREFERRED EMBODIMENTS

Figure 1:
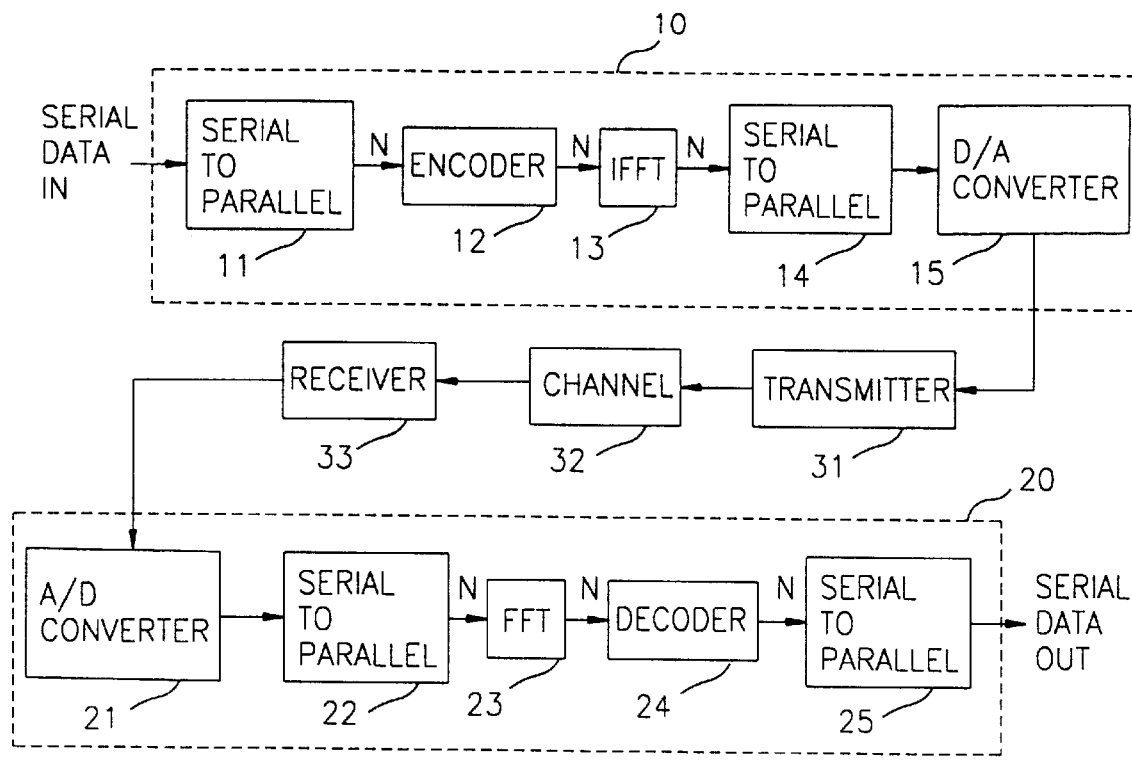
FIG. 1 is a schematic block diagram of a transmitting and receiving system using orthogonal frequency division multiplexing.
Figure 2:
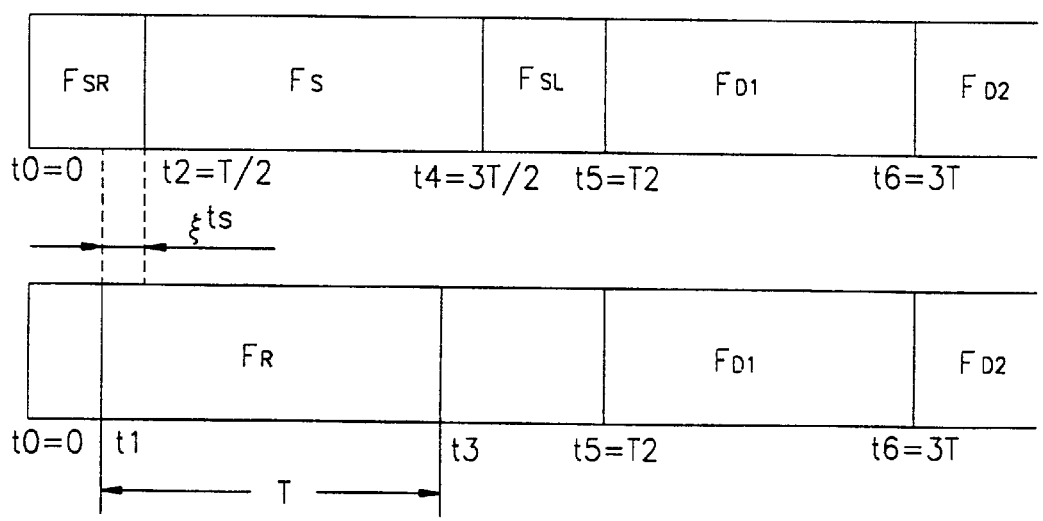
FIG. 2 is a graph depicting the signal frame structure for the initial frame synchronization method of the present invention.

FIG. 2 shows an illustration of the frame structure for the initial frame synchronization method of the present invention. As shown in FIG. 2, the frame (Fs) and the half frames (Fsr, Fs$_L$) at each side of the frame (Fs) are the frames for the initial synchronization, and the subsequent frames (F$_{D1}$, F$_{D2}$, ...) are message data frames. The frame (Fsr) for initial synchronization corresponding to a half frame is a duplication of the right half of the frame (Fs) for initial synchronization, and the frame (Fs$_L$) for initial synchronization, a duplication of the left half thereof, and the frame (Fs) for initial synchronization comprises 4-QAM signals. In FIG. 2, the reference designations T, ts, and (ζ) denote the frame symbol time, the sampling interval, and the number of shifted sample points corresponding to the synchronization offset, respectively. At the beginning of the synchronization operation, the continuous frame (F$_k$) of time (T) is taken from among the frames (F$_{Sk}$, F$_S$, F$_{SL}$) in the preamble for the initial synchronization. Accordingly, the frame (F$_k$) is located between the times (t$_o$ and t$_s$). The synchronization offset (ζ) results in $|\zeta| \leq N/2$ (where N is the number of samples per frame), and the synchronization time (t$_s$) may be found by estimating the synchronization offset value, as will be described in detail in the following.

The receiving system noise is generally expressed by the mathematical formula: $r_n = s_n + v_n$, where $s_n$ is the transmitted signals sampled in the sampling interval (t$_s$); $v_n$, the additive white Gaussian noise (AWGN) the power spectrum density of which is No/2; and $r_n$, the received OFDM signal. The N-point discrete Fourier transform (DFT) of ($s_n$), ($v_n$) and ($r_n$) is represented as $s_k v_k$ and $R_k$, respectively. By way of illustration, $S_k$ is obtained by the following equation:

$$S_k = \sum_{n=0}^{N-1} s_n \exp[-j2\pi kn/N]$$

where the lower case notations represent the signals in the time domain, and the upper case notations designate those in the frequency domain.

In case where there exists a frame synchronization offset as much as the time (ζ t$_s$), that is an ζ sample interval in the received signal (r$_n$), if there is no noise, the phase of the kth subcarrier will be shifted by the angle of $\phi_k = e^{j2\pi\zeta k/N}$. It was shown in K. W. Kang, Jaemin Ann, and H. S. Lee, "Decision-Directed Maximum Likelihood Estimation of OFDM Frame Synchronization Offset", IEE, Electrics Letters, Vol. 30, No. 25, Dec. 8th 1994, pp. 2153–2154 that when the frame synchronization offset (ζ) is given under the additive white Gaussian noise, the conditional probability density function P($\phi_R|\zeta$) which is to be $\phi_k$, can be approximated as shown in the following equation:

$$p(\phi_k|\xi) = \frac{1}{\sigma_{\phi_k}\sqrt{2\pi}} \exp\left[-\frac{(\phi_k - 2\pi\zeta k/N)^2}{2\sigma_{\phi_k}^2}\right] \quad (1)$$

Where $$\sigma_{\phi_k} = \sqrt{NWN_o}/(\sqrt{2}\,|S_k|),$$

and W is the bandwidth of the channel.

In case of 4 QAM signals, $\sigma_k = \sigma_\phi$ for all k. If the absolute value of $\phi_k$ is more than $2\pi$, the shifted extent is not obtained directly, and the present invention introduces a new variable ($\phi$) as in the following equation (2):

$$\phi = \phi_{kc} - \phi_{k1} \quad (2)$$

Where $k_c$ and $k_1$ represent the locations of the subchannels of the used ones, corresponding to the highest and lowest frequencies, respectively. With a definition that the variation of the phase difference of the adjacent subcarriers is $\theta_k$, and $\theta_k = \phi_k - \phi_{k-1}$, it may be represented as $\phi =$ $$\varphi = \sum_{k=k_2}^{k_c} \theta_k.$$

$\theta_k$. $\theta_k$ may be obtained theoretically contrary to $\phi_k$, and it may also be easy to obtain $\phi$. Furthermore, the mean and variance of $\phi$ may be obtained in accordance with some numerical formulae, and in conformity with the method finding the mean and variance of independent random variables consisting of a linear combination. In other word, if the frame synchronization offset (ζ) is given, the mean of $\phi$, E [$\phi|\zeta$] may be obtained by the following formula (3):

$$E[\phi|\xi] = E[\phi_{K_c} - \phi_{K_1}|\zeta] \quad (3)$$
$$= E[\phi_{K_c}|\zeta] - E[\phi_{K_1}|\zeta]$$
$$= \frac{2\pi}{N}\zeta(K_c - K_1)$$
$$= \frac{2\pi}{N}\zeta(C - 1),$$

Where C represents the number of the subchannels used a $C = K_c - K_1 + 1$.

Thus, the variance(var($\phi$)) may be obtained by the following formula (4):

$$\text{var}(\phi) = \text{var}(\phi_{K_c} - \phi_{K_1}) = 2\sigma^2_\phi \quad (4)$$

Finally, the probability density function may be obtained by the following formula:

$$p(\phi|\zeta) = \frac{1}{\sqrt{2\pi}\sigma_\phi} \exp\left\{-\frac{\left[\phi - \frac{2\pi}{N}\zeta(C-1)\right]^2}{2\sigma_\phi^2}\right\} \quad (5)$$

Subsequently, it is followed to find the estimate value (ζ) maximizing p($\phi|\zeta$) by applying the ML estimation method to the said formula (5). As shown in the following formula (6), the estimate value (ζ) may be obtained by taking first the natural logarithms on both sides, and then making a partial differential to (ζ) on both sides, and finally finding (ζ) which makes the result of such partial differential to be zero:

$$\frac{\partial}{\partial \hat{\zeta}} \ln p(\phi | \zeta) = 2 \frac{\phi - \frac{2\pi}{N}\hat{\zeta}(C-1)}{2\sigma_\phi^2} \frac{2\pi}{N}(C-1) = 0 \quad (6)$$

$$\phi - \frac{2\pi}{N}\hat{\zeta}(C-1) = 0$$

$$\therefore \hat{\zeta} = \frac{N}{2\pi(C-1)}\phi$$

And, the variance (var($\hat{\zeta}$)) of the estimate value ($\hat{\zeta}$) may be obtained by the following formula (7):

$$\mathrm{var}(\hat{\zeta}) = \mathrm{var}\left(\frac{N}{2\pi(C-1)}\phi\right)$$

$$= \left[\frac{N}{2\pi(C-1)}\right]^2 \mathrm{var}(\phi)$$

$$= \left[\frac{N}{2\pi(C-1)}\right]^2 2\sigma_\phi^2$$

are substituted, $$\sigma_\phi^2 = \left(\frac{\sqrt{NWN_0}}{\sqrt{2}}\right)^2 \frac{1}{|S|^2}, \ |S|^2 = NW\varepsilon |A|^2, \ |A|^2 = 2 \quad (7)$$

$$\mathrm{var}(\hat{\zeta}) = \left(\frac{N}{2\pi}\right)^2 \frac{1}{(C-1)^2} \frac{1}{2}\left(\frac{\varepsilon_b}{N_0}\right)^{-1}$$

Where $\varepsilon_b$ represents the average energy by bit of subchannels, and $\varepsilon_b/N_o$ is the average signal to noise ratio per bit.

Figure 3:
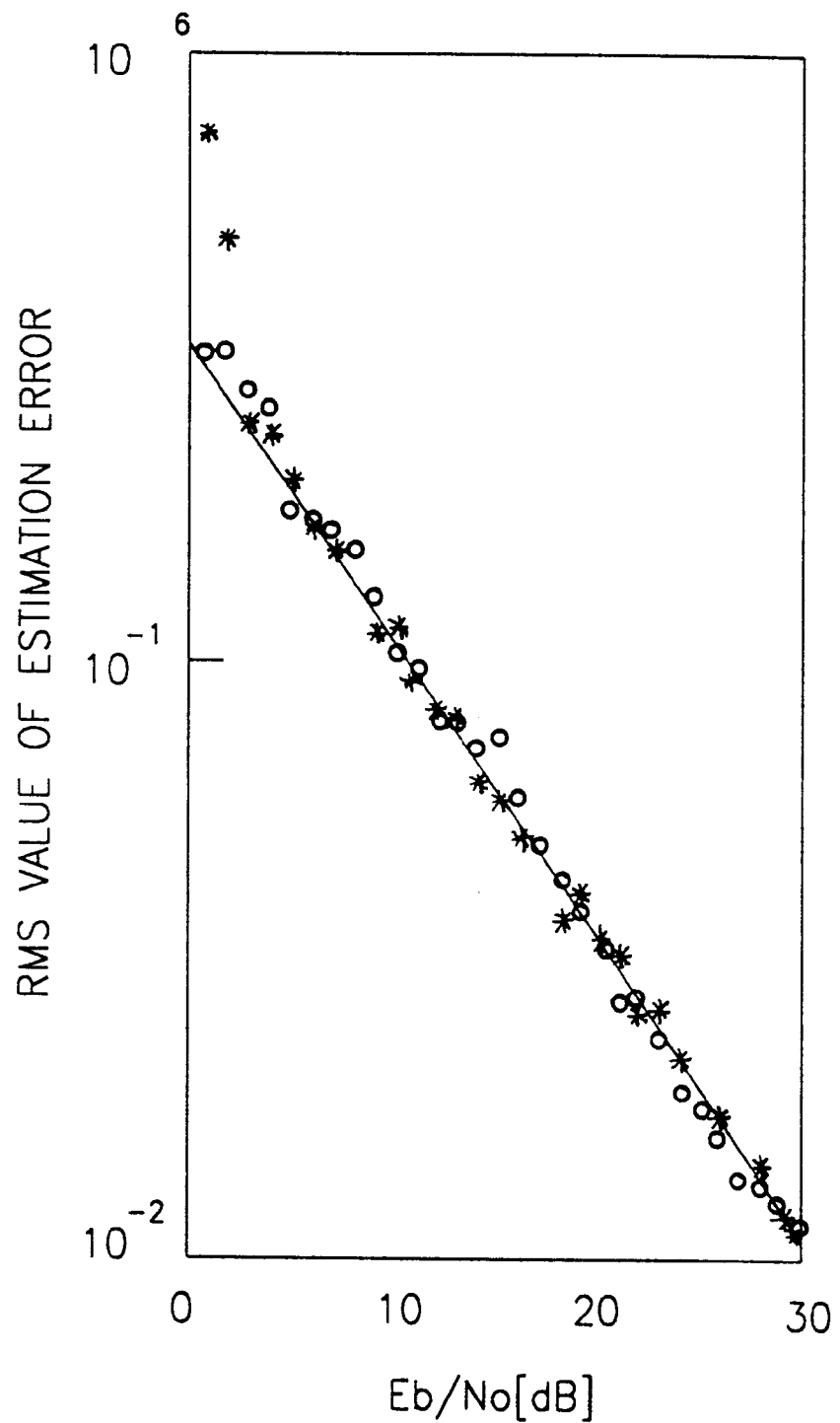
FIG. 3 is a graph illustrating the results of experiments conducted by applying the initial frame synchronization method of the present invention.

A preferred embodiment of the present invention applying the initial frame synchronization method of the present invention to a transmittion of the orthogonal frequency division multiplexing signals through the channels in which any additive white Gaussian noise exists, is operated as follows:

512 subchannels were obtained with the channel bandwidth of 4 KHz, sampling frequency of 8 KHz, 1024 samples inserted in a frame, and the channel interval of 7.8125 Hz. The algorithm developed by the initial frame synchronization method of the present invention was verified using 348 subchannels in the 40th and subsequent order of the ones. In carrying out this embodiment, the algorithm was embodied in a program using C language, and a frame synchronization offset was made arbitrarily through a computer simulation to confirm whether or not such offset value is detected exactly. FIG. 3 represents the result of the said research, and the real line shown in FIG. 3 represents the theoretical standard deviation of the synchronization offset estimate value ($\hat{\zeta}$) depending on the value of $\varepsilon_b/N_o$, and the data shown by the marks "o" and "x" represents the root mean square (RMS) values of the estimation error obtained by applying it to 100 frame signals. When each frame comprises 1024 samples, "o" is a data on an estimation error resulted from a deviation of at least 250 samples, and "x" 500 ones, respectively. It is hereby noticed that the result of simulation coincides well with the theoretical values. However, in a domain where the signal to noise ratio is very low, there shows a large discrepancy between the root mean square and the theoretical values of the offset estimation error, because some phase offset variations ($\theta_k$) lose the accuracy in the course of finding ($\theta_k$), when the signal to noise ratio is low. Once the synchronization offset estimate ($\hat{\zeta}$) is obtained, it is possible to compensate the synchronization offset by multiplying $e^{-j2\pi k \hat{\zeta}/N}$ to the received signals ($R_k$) in the frequency domain.

As above-described in details, the present invention can realize simply and rapidly the initial frame synchronization by finding and synchronizing the initial frame synchronization offset at the receiving step, using the orthogonal frequency division multiplexing signals, and by means of the estimation method of the phase difference variation and the maximum likelihood in the frequency domain, and it has the effect applicable not only to the orthogonal frequency division multiplexing system, but to other systems requiring the initial synchronization process.

What is claimed is:

1. A synchronization method for initial frame, comprising the steps of:

transmitting at a transmitter for an initialization two known frame signals for an initial synchronization;

receiving at a receiver an input of said two transmitted frame signals for initial synchronization, and taking the frame signals for initial synchronization in the time of one frame interval;

finding out the maximum phase deviation which is a difference between the highest and lowest frequency phases; and obtaining the initial frame synchronization offset from the maximum phase deviation to synchronize the initial frame.

2. The method of claim 1, wherein the frame signals for initial synchronization comprises one frame for initial synchronization consisting of already known bit streams, and the half frames for initial synchronization which are obtained by duplicating the right and left halves of the frame for initial synchronization and connecting each half frame to the right and left end of the frame for initial synchronization.

3. The method of claim 1, wherein the maximum phase deviation is obtained by obtaining the differences from the neighboring phase differences with respect to all used carrier waves and by summing up the obtained differences.

4. The method of claim 3, wherein the initial frame synchronization offset value is obtained using a conditional probability density function as a parameter representing the maximum phase deviation, together with the maximum likelihood estimation method.

5. The method of claim 1, wherein once the initial frame synchronization offset value is obtained, the synchronization offset is compensated using the received signals in the frequency domain.

* * * * *